Aug. 30, 1955 L. G. DANIELS Re. 24,055

MULTIPLE PORT VALVE

Original Filed Jan. 9, 1946 4 Sheets-Sheet 1

INVENTOR.
Lee G. Daniels
BY
McCanna and Morsbach

MULTIPLE PORT VALVE

Original Filed Jan. 9, 1946 4 Sheets-Sheet 2

INVENTOR.
Lee G. Daniels
BY
McCanna and Morsbach

MULTIPLE PORT VALVE

Original Filed Jan. 9, 1946 4 Sheets-Sheet 3

INVENTOR.
Lee G. Daniels
BY
McCanna and Morsbach

INVENTOR.
Lee G. Daniels
BY
McCanna and Morsbach

United States Patent Office

Re. 24,055

Reissued Aug. 30, 1955

24,055

MULTIPLE PORT VALVE

Lee G. Daniels, Rockford, Ill.

Original No. 2,605,992, dated August 5, 1952, Serial No. 639,920, January 9, 1946. Application for reissue October 28, 1954, Serial No. 465,768

11 Claims. (Cl. 210—24)

Matter enclosed in heavy brackets [ ] appears in the original patent but forms no part of this reissue specification; matter printed in italics indicates the additions made by reissue.

This invention pertains generally to valves, and more particularly to multi-port valves of the rotary plate type, some features of the invention being capable of embodiment in either a plain rotary valve or a lift-turn valve. Broadly speaking, the novel features hereinafter disclosed constitute improvements upon my prior Patent No. 2,364,697, issued December 12, 1944.

Valves of this character, when employed as the control valve for water softeners, and particularly in large commerical softeners, are arranged to deliver the brine or other regenerating reagent over and in proximity to the bed of zeolite. For purposes of brine economy it is desirable to deliver to the head chamber just above the zeolite a brine flow simultaneously with a water flow thereto and above the level of the delivered brine, so the low of water will induce an immediate down flow of the brine into the bed without stagnation of the brine in the top of such chamber.

An important feature of my invention resides in the provision of a novel structural arrangement of the valve, whereby the above indicated result may be effectively accomplished.

Another object of the invention is the provision of a novel port arrangement permitting the over-all dimensions of the valve to be smaller and yet give improved flow characteristics.

Another object is to reduce the cost of manufacture of valves of this character through the provision of a valve structure in which a plurality of different valves may be made from the same patterns.

Other purposes and advantages of my invention will be readily appreciated as the same becomes better understood by reference to the following description when considered in connection with the accompanying drawings.

Referring to the drawings.

Figure 1:
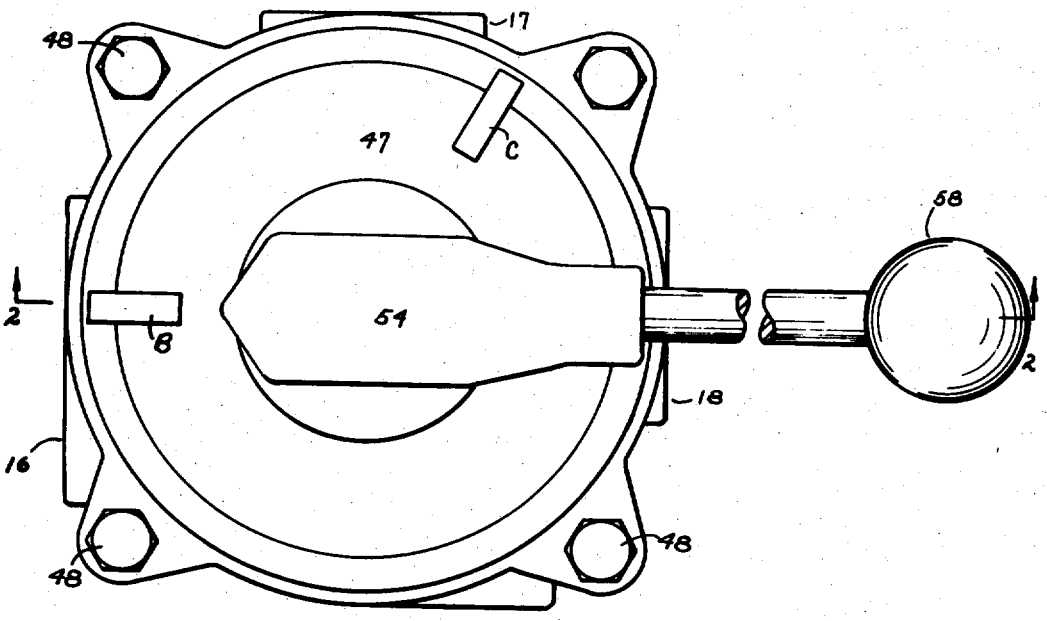
Figure 1 is a plan view of a valve embodying the principles of my invention.

Referring now to the structural features of the invention exemplified in Figs. 1–8, inclusive, of the drawings, the valve which is particularly adapted for use as the fluid flow control valve of a water treating apparatus consists primarily of a ported body or stator adapted to be connected with the various pipes or conduits of a water treating system and a ported rotor or valve plate having a flat face arranged in confronting relation to the face of the body. The valve plate is designed and constructed to cooperate with the body in a plurality of operative positions to produce various desired fluid flows through the system. The body, stator or base indicated generally by reference character 11 (Figs. 2 and 7) is generally made of cast metal and shaped to provide a plurality of chambers, in the present instance five, comprising a top chamber 12, a side chamber 13, a bottom chamber 14, a side chamber 15, and an injector chamber 26, the chambers having tapped openings 16, 17, 18, 19 and 65, for pipe connections, adapted to receive and be connected to the various fluid conducting pipes or conduits of the system. The face of the body is provided with port locations having ports communicating with said chambers, as indicated by reference characters 21, 22, 23, 24, and 25, respectively. These ports 21 to 25 are all formed on an equal radius from a common center on the face of the body, and each port is spaced or arranged 60° from the adjacent or nearest port.

Figure 7:
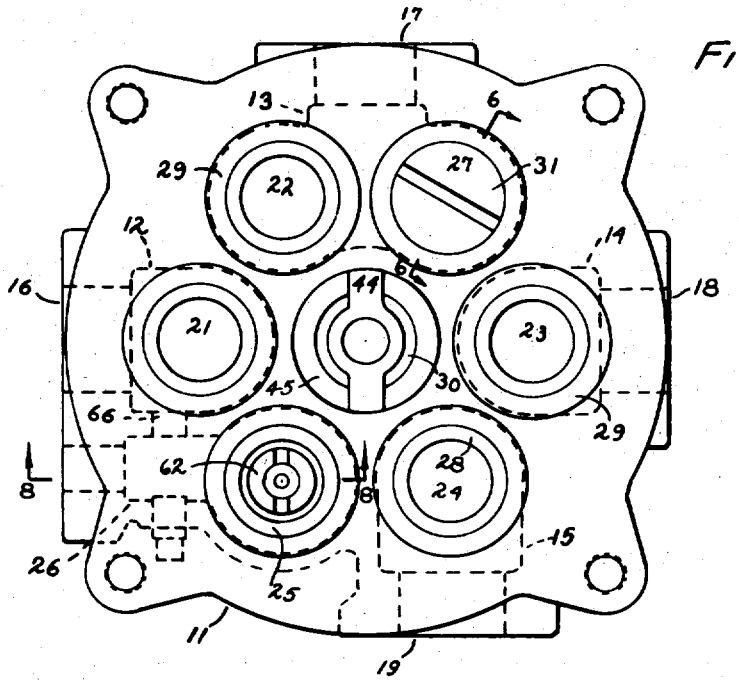
Fig. 7 is a plan view of the valve body.
Figure 8:
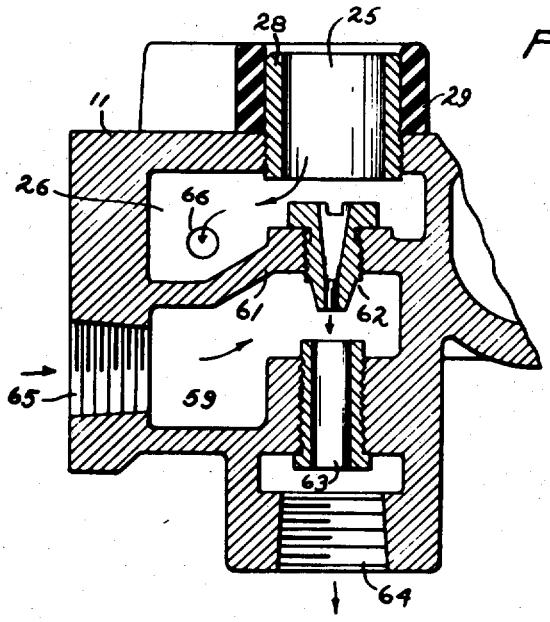
Fig. 8 is a fragmental sectional view on the line 8—8 of Fig. 7.

In addition, the body is provided with a chamber or connection 59 in communication with chamber 26, and the body also has a port location which will be termed a false port 27, which in the form of body shown in Fig. 7 does not provide an opening to establish communication with the chamber 13, but affords an area of contact or support for the rotor at this point to insure uniformity in balance and which, when the plate is in seated relation with the body, closes certain ports in the transfer passage 39 of the plate in different operative *positions* [position] thereof.

Each of ports 21 to 25, inclusive, is formed by an upwardly projecting thimble or bushing or ferrule 28 which is threaded into or has a drive fit with the body so as to project upwardly therefrom a predetermined distance. A sealing ring or supporting seat 29 of suitable resilient compressible material, such as rubber, surrounds each bushing 28 and projects above the upper end thereof so as to provide an annular seating surface against which the flat face of the superposed valve plate will seat to provide a seal around each port.

Figure 6:
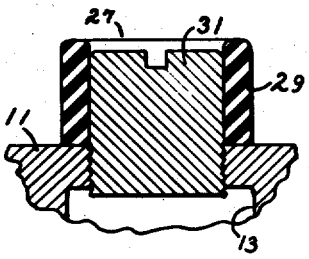
Fig. 6 is a fragmentary sectional view through the false port of the body.
Figure 9:
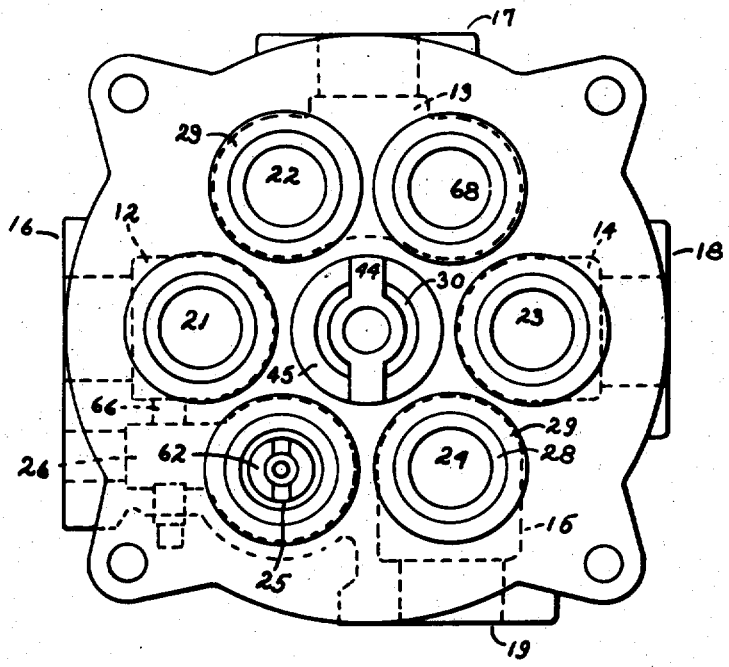
Fig. 9 is a view similar to Fig. 7 of a valve body with the plug of the false port removed and replaced by a bushing.

The false port 27 consists of a plug 31 surrounded by one of the gasket rings 29. The plug, as shown in Fig. 6, is threaded into a tapped opening in the body. In order that the same body may be employed in systems where port 27 would be either a false port as here exemplified or an open port as shown in Fig. 9, the threaded portion of plug 31 and the tapped opening in the body into which it is threaded may be the same size as the other ports and thimbles, to provide an open port communicating with chamber 13 when the plug is removed and a bushing or ferrule such as 28 screwed therein.

In addition to the ports above described, the body may be provided with a central inlet 30 for raw or hard water. If preferred, however, such water may be admitted to the valve cover above the plate through a suitable port in the cover to be later described.

Figure 3:
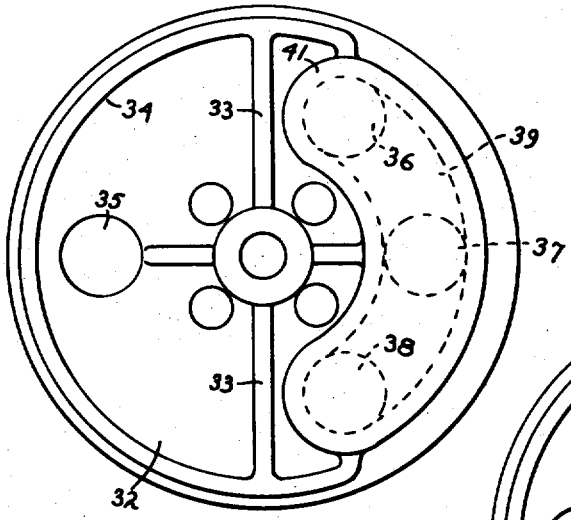
Fig. 3 is a plan view of one form of the valve plate shown in Fig. 2.
Figure 4:
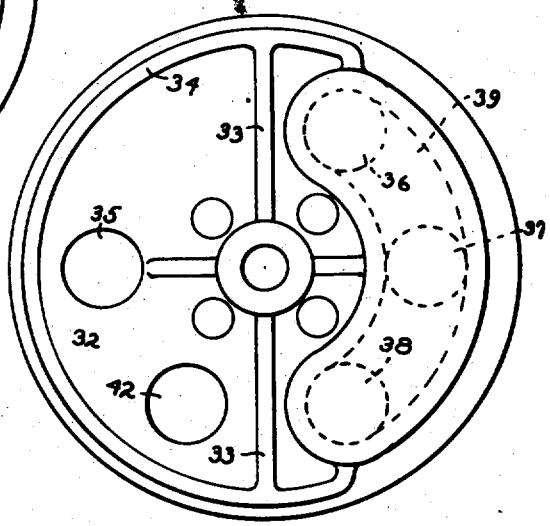
Fig. 4 is a similar view of a modified valve plate.

The valve plate, stem plate or rotor adapted for use with the body above described may be of the design illustrated in Fig. 3, which shuts off flow of fluid to service during the regeneration of a water treatment apparatus to which the valve is connected, or it may be of the design exemplified in the embodiment of Fig. 4 which is adapted to deliver untreated water to service during the regeneration of the treatment apparatus. The only difference in the two plates is that the plate of Fig. 4, designed to furnish untreated water to service during the regeneration periods, is provided with an additional port. The plate of Fig. 3 may be converted into that of Fig. 4 by simply drilling or boring another port through the plate, as will be later explained.

Referring to Fig. 3, it will be observed that the plate indicated generally by reference character 32 (Figs. 2 and 3) is of a plate or disk-like construction having a flat lower seating face and radial and circumferential reinforcing ribs 33 and 34, respectively, on its upper face. A supply port or an open through port 35 extending completely through the plate and return ports 36, 37, and 38 are concentrically arranged on equal radii from the center of the valve plate to align or register with the similarly arranged ports of the body. Open ports 36, 37, and 38 extend into a transfer passage 39 formed by an upwardly projecting hollow portion 41 of the cast plate. On each side of through port 35 there is a blind portion comprising the flat face of the plate.

The valve plate of the species shown in Fig. 4 is identical in all respects with that of Fig. 3, except that an additional open through port 42 extending completely through the valve plate and spaced sixty degrees from the adjacent port 35 is provided, and, like Fig. 3 has a blind portion located between ports 35 and 36. The valve plates may be manufactured in the two types disclosed in Figs. 3 and 4 and used interchangeably to meet the requirements of particular installations. For instance, for use in a water softening system in which delivery of hard water to service during the regeneration period is undesirable, the plate of Fig. 3 would be employed. On the other hand, for installations requiring delivery of hard water to service during the regeneration period of the softener, the plate of Fig. 4 with the port 42 would meet the requirements. It will thus be seen that the plates are made from the same patterns and castings, the port arrangement being such as to produce the required flows by simple changes in the plate to provide the different species of plates. The valve bodies are the same—namely that shown in Fig. 7.

The plate, irrespective of type, is fixedly mounted upon a stem 43, the lower end of which is journaled in a yoke 44 carried by and extending upwardly from the upper end of a bushing or sleeve 45 (Fig. 2) threaded into or otherwise anchored in the central inlet 30 of the stator. The stem 43 is also journaled above the plate in a bearing 46 depending from the cover, cap or bonnet 47 in which the plate is enclosed or housed, this cover being secured to the body by bolts 48 (Figure 1), a gasket 49 being clamped between the body and the cover to preclude leakage. Leakage around the stem 43 is precluded by suitable packing 51 compressed around the stem by a packing nut 52.

The upper end of stem 43 is connected by a pin 53 with an operating handle 54 provided at its inner end with a downwardly projecting toe 55 adapted to ride upon the smooth upper or flat surface of the cover during operative movements of the plate. A coiled expansion spring 56 interposed between the plate and an annular shoulder carried by the cover 47 urges the plate toward the body and normally holds the plate in sealing engagement with the sealing rings 29 surrounding the body ports.

To move the valve plate from one operative position to another for the purpose of effecting a change and establishing a desired or different fluid flow through the system, the lever 54 is first raised or lifted upwardly, whereupon the toe 55 acts as a fulcrum to lift the stem 43 and the valve plate which is fixed thereto up and free from the sealing rings of the body and is then turned to turn the valve plate. The handle is turned about the stem 43 as an axis, so as to align the requisite ports and blind portion or portions of the valve plate with certain of the body ports in preselected positions to establish the desired fluid flows.

Figure 5:
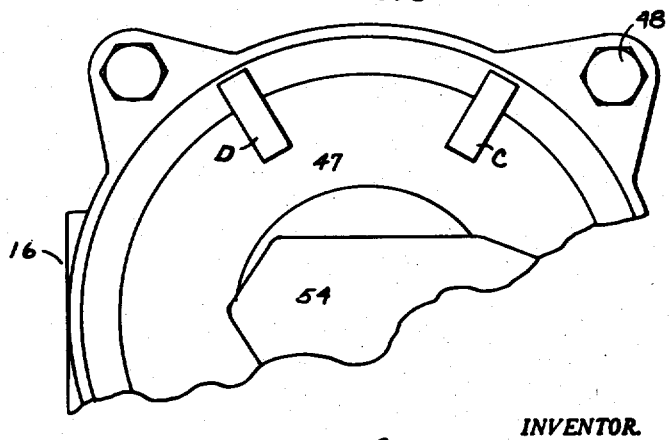
Fig. 5 is a fragmentary view of a modified form of cover for use with the valve plate of Fig. 4.

To prevent accidental shifting or turning of the valve plate when in seated relation to the body, the handle is equipped with a depending latch 57 adapted to be engaged in any one of a series of notches or slots with which it may be aligned and into which it will be urged by the spring 56 upon seating of the plate. The plate of Fig. 3 cooperates with the body of Fig. 7 and the cover of Figure 1, the cover of Figure 1 having notches A, B and C for reception of the latch 57 to locate the plate in the required positions. The plate of Fig. 4 cooperates with the body of Fig. 7 and the cover of Fig. 5, the latter being identical with the cover of Figs. 1 and 2 except for the notches, this form having a notch D defining the backwash position of the valve at 240 degrees from the notch A instead of 180 degrees as in Figs. 1 and 2. The *covers* [cover] of Fig. 1 and Fig. 5 are of course both made from the same pattern, the only difference being in the points at which the notches are milled therein. Alternately one cover may be made and the notches not to be used may be closed by a plug or filler.

Adjacent the port 25 the body 11 is shaped to provide the chamber 26 with which port 25 communicates and also a reagent chamber or connection 59 beneath the chamber 26 separated therefrom by a wall 61 in which is mounted a nozzle 62. *An injector* [A] tube 63 disposed in alignment with the nozzle 62 establishes communication between the chamber 59 and a tapped connection 64 to which a pipe leading to and extending into the head chamber of the zeolite tank just above the mineral bed is connected. A tapped connection 65 leading from chamber 59 is adapted to be connected with a pipe or conduit leading from a reagent supply tank. A passage 66 leading from chamber 26 is connected with chamber 12, the pipe connection of which leads to the head space of the zeolite tank, the passage being adapted to deliver water to the head space above the plane of delivery of the reagent thereto to thereby cause the reagent to flow downwardly through the zeolite bed and prevent its accumulation in the chamber. This construction results in economy in the amount of reagent and water used.

Figure 2:
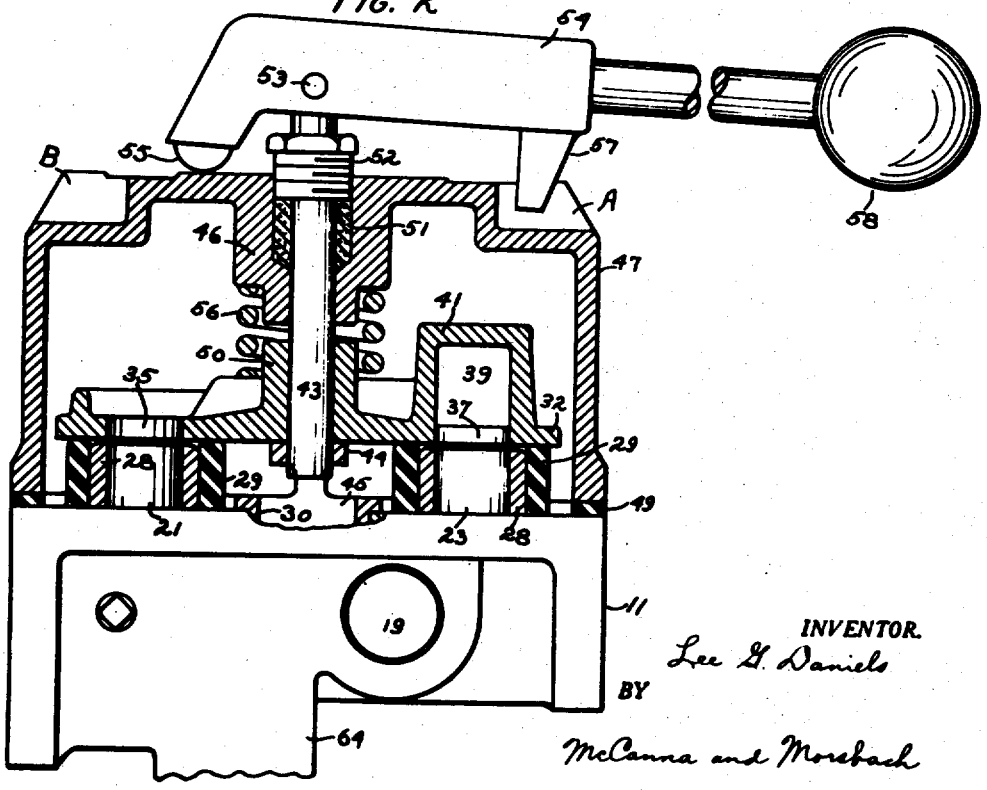
Fig. 2 is a vertical sectional view on a median line 2—2 through the valve of Figure 1.

Assuming that a water softening system in which hard water is not to be delivered to service during regeneration, has been installed and equipped with a control valve embodying a plate of the type shown in Fig. 3 and cover as shown in Figs. 1 and 2, the various fluid flows required by such a system will be attained by manipulation of the valve in the following manner. Starting with the softening position of the valve as shown in Figs. 1 and 2, water will enter the interior of the cover through the central inlet 30 or through a pipe connected to deliver into the cover 47. From the interior of the cover the flow will be through open plate port 35, body port 21, top chamber 12, to the top of the softening tank, and return from the softening tank through bottom chamber 14, body port 23, plate port 37, transfer passage 39, plate port 38, body port 24, and side chamber 15, to service. The blind portions of the plate close body ports 22 and *25* [23], and the false port 27 of the body closes port 36.

When backwash becomes necessary, the handle 54 will be lifted to free the catch from the notch A and disengage the plate from the body, whereupon the handle will be turned 180° viewing Figure 1 to align the latch with the notch B and permit the reseating of the plate upon the body under influence of spring 56. The flow will now be from the interior of the cover through plate port 35, body port 23, bottom chamber 14, to the bottom of the softening tank, and return from the top of the softening tank through top chamber 12, body port 21, plate port 37, transfer passage 39, plate port 38, body port 22 and side chamber 13 to drain or waste. One blind portion closes body port 24 and the other blind portion seats over false port 27 of the body. Since plate port 36, in this position of the plate, registers with body port 25, there may also be a small but minor flow from the top chamber 12 through the passage 66 and the ports 25 and 36 into transfer passage 39. This flow joins the main stream in the transfer passage and passes to drain through ports 38 and 22.

At the conclusion of the backwash, the handle is lifted and turned in a clockwise direction through 120° to engage the latch 57 in the notch C, whereupon the flow will be from the interior of the cover through open through plate port 35, body port 25, chamber 26, nozzle 62, chamber 59, and tube 63 to connection 64, thence to the head space of the softening tank. Brine will be drawn into the connection or chamber 59 through the connection 65 by the injector action of the nozzle 62 and tube 63, and water also will flow from chamber 26 through passage 66 into top chamber 12, and thence through connection 16 to the top of the head space above the reagent delivery thereto. From the bottom of the softening tank the return flow is through bottom chamber 14, body port 23, plate port 38, transfer passage 39, plate port 36 and body 22 through side chamber 13 to drain. The blind portions of the plate close body ports 21 and 24. After the brine flow has been shut off by a brine flow termination valve and the water flow has continued until the brine rinse has been completed, the valve is lifted and turned 60° further in a clockwise direction to return it to normal softening position with the latch engaged in the notch A.

When a plate 32 having an open port 42 is employed, such as the plate 32 of Fig. 4 and cover of Fig. 5, continuous delivery of water to service in all positions of the valve will be furnished and the various flows will be as follows. With the handle in softening position, as it is when latch *57* [17] is engaged in notch A, the normal flow through the softening tank will be the same as that obtained when the plate of Fig. 3 is employed. The blind portion of the plate closes body port 22 and the false port 27 of the body closes the port 36. Of course, there will be, in addition to the softening flow previously described, a flow of water through plate port 42, port 25 to chamber 26, passage 66 and connection 64, but since at such time the reagent flow is shut off and the flows through passage 66 and connection 64 both go to the head space at the top of the softening tank, the effective flow is the same as if all of the water passed through body port 21.

For backwashing, the handle is lifted and turned in a clockwise direction, viewing Figs. 1 and 5, through an arc of 240° to carry the latch 57 into alignment with notch D (Fig. 5). This disposes port 35 in alignment with port 24 to deliver hard water to service during backwashing, while port 42 is aligned with port 23 for the delivery of water to the bottom of the tank for backwashing. Upon return the backwash water is discharged through body port 21, plate port 36, transfer passage 39, plate port 37, body port 22 and chamber 13 to drain. The blind portion of the plate closes the body port 25.

For brining and brine rinse the plate is moved clockwise 60° to align the latch or catch 57 with notch C, thereby bringing plate port 42 into alignment with body port 24 to continue the delivery of hard water to service, while plate port 35 becomes aligned with body port 25 to deliver water to the head space of the tank and draw reagent from the supply tank into the chamber 59 to the tank at a point above the mineral bed. The blind portion of the plate closes body port 21 and the false port 27 of the body closes the passage port 37. When rinsing is complete as described in connection with Fig. 3, the plate is moved through another 60° to the service position.

It will be apparent, therefore, that the employment of a plate having the open port 42 provides a continuous supply of hard water to service while the regeneration steps of backwashing, brining, and rinsing are being carried out. With the type of body disclosed in Fig. 7 having a false port 27, no flow through this port occurs and the gasket ring 29 serves to close a port in the transfer passage in various operative positions of the valve plate.

Figure 10:
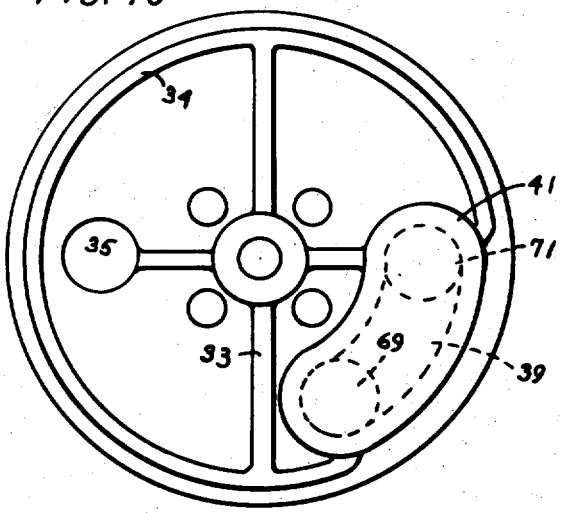
Fig. 10 is a plan view of the valve plate designed for use with the body of Fig. 9.

In the form of the invention shown in Figs. 9 and 10 the body 11 is identical with that of Fig. 7 except that the false port 27 is opened by removal of the plug 31, becomes open port 68 and communicates with the drain or side chamber 13, providing two ports 22 and 68 communicating with this chamber. These body ports 21, 22, 23, 24, 25 and 68 are all formed on an equal radius from the center of the face of the body, and each port is spaced or arranged 60° from an adjacent port. In this form, a modified form of plate is employed, such as shown in Fig. 10, having but three ports, namely through port 35, ports 69 and 71, and having three blind portions, one on each side of through port 35 and one adjacent port 71. The ports 69 and 71 are connected by a transfer passage similar in construction and function to the passage 39 of the rotors previously described. The various flows obtained by employment of the plate of Fig. 10 in conjunction with the body of Fig. 9, are as follows. For softening, the position of the valve plate 32 is the same as shown in Figs. 1 and 2 of the drawings, so that water flows from the interior of the cover through ports 35 and 21 to the softening tank and back through ports 23, 71, 69 and 24 to service. The blind portions of the valve plate close the body ports 22, 25 and 68.

For backwashing, the handle is moved through 180° to position B, causing flow of water from the interior of the cover through ports 35 and 23 to the bottom of the tank, through the water treating material, and back through ports 21, 71, passage 39 and ports 69 and 22 to the side chamber 13 and to drain. The blind portions of the valve plate close body ports 24, 25 and 68.

For regenerating and rinse the plate is moved through an additional 120° to position C and water is then delivered from the interior of the cover through ports 35 and 25 to the softening tank, and returns through ports 23, 69, transfer passage 39, port 71 and port *68* [27] to the side or drain chamber 13 to waste. The blind portions of the valve plate close body ports 21, 22 and 24. To return the valve to service position the plate is then lifted and rotated through a further 60°. It will be observed that this type of plate and body having six open ports, is preferable in some respects to valves employing plates of the types disclosed in Figs. 3 and 4, particularly in the larger size for heavy duty industrial use where flow to service is not wanted during regeneration.

It should be apparent from the foregoing that I have provided a valve of simple construction which is well balanced and adapted to snugly seat and provide a leakproof seal around all of the ports. Any of a plurality of valves may be made from one set of patterns by simple changes in the manner of finishing the ports. Furthermore, the body ports being spaced 60° from the adjacent port and concentrically arranged, provide a plainer and better seating support for the plate, obviate tilting and leaking tendencies, and permit the different forms of the valve to be made from the same patterns.

In addition I have provided in a single valve a novel brine injector arrangement and wherein brine is supplied to the header chamber of the softened tank and a small flow of water is simultaneously maintained to the top of the tank in a single valve operation.

The valve herein shown and described as exemplifying the principles of my invention is of the lift-turn type, but it should be understood that some, at least, of the novel features of the invention are adaptable to valves of the pure rotary type in which the plate remains constantly in engagement with the body. The structural details illustrated and described may obviously be varied within considerable limits without exceeding the scope of my invention as defined in the following claims.

I claim:

1. A valve comprising a body having a top chamber, a bottom chamber, two side chambers [and an injector chamber], each of said chambers being provided with an opening for connection with a pipe, *and an injector chamber*, said body having a face provided with ports arranged 60° from an adjacent port, each of said ports communicating with at least one of said chambers, said body also having a reagent chamber provided with *an inlet* [a pipe]

connection, [and] a passage of smaller cross-sectional area than said ports connecting said injector chamber with said top chamber, an injector nozzle disposed between said injector chamber and said reagent chamber to deliver water from the injector chamber *into a discharge connection from the reagent chamber* [into the pipe connection of the reagent chamber] and thereby withdraw reagent from the latter, a valve plate arranged in confronting relation to said face of said body, a cover secured to said body and enclosing said valve plate, means for introducing fluid under pressure into said cover, means on said valve plate providing enclosed transfer passage means, said valve plate having through port means extending completely therethrough, open ports extending into said transfer passage means, and blind portion means, the ports of said body and valve plate being formed upon substantially equal radii, said valve plate being movable into a plurality of operative positions including a first position in which said open through port means establishes communication between the interior of said cover and said top chamber, said transfer passage means interconnects said bottom chamber and one of said side chambers and said blind portion means closes communication to the other of said side chambers, and another position in which said open through port means establishes communication between the interior of said cover and said injector chamber to deliver water to the injector chamber for passage to *the nozzle and the top chamber* [the top chamber and to the nozzle], said transfer passage means interconnects said bottom chamber and the other of said side chamber and said blind portion means closes a port communicating with said top chamber.

2. *A base exchange water treating system including a treatment tank having a head space, a control valve, and conduits connecting said control valve with said treatment tank, said control valve comprising* [In a control valve for water treatment apparatus, the combination of] a body provided with a series of ports arranged in a circle each spaced 60° from an adjacent port, the body being formed to provide [a] *an injector* chamber communicating with one of said ports, a nozzle in the wall of said chamber aligned with said port and a connection to receive the discharge from said nozzle, [said connection being adapted to be in communication with the head space of a treatment tank,] a reagent supply passage adapted to deliver reagent to said connection under the influence of the discharge from said nozzle, *a conduit leading from said discharge connection to the head space of the treatment tank, and a separate connection from said injector chamber to said head space of the treatment tank* [and said chamber being provided with a passage adapted for connection to said head space to supply water thereto above the reagent delivered from said connection] *discharging into said head space at a point above the discharge from said discharge connection.*

3. A valve of the rotatable type, comprising a body having six equally spaced apart port locations arranged in a circle concentric with the body, five of said locations being provided with ports and the remaining location being provided with a false port, a plate supporting seat disposed in each of said locations, connections leading from said port locations adapted to communicate with the various fluid flow conduits of a water treating system, a valve plate adapted to rest upon said seats, said plate being provided with a port extending therethrough and with downwardly opening ports connected by a passage, and means for rotating said plate to establish fluid flows for normal service of a water treating system and in other positions to establish flows for reconditioning the water treating material.

4. A control valve for a water treating apparatus of the base exchange type, comprising a body having six concentrically arranged port areas equidistantly spaced apart, five of said areas being provided with port openings and the remaining area being provided with a false port, each of said areas being equipped with a plate supporting sealing ring, a valve plate having multiple ports arranged to register with said body ports, two of said plate ports being adapted to conduct raw water from above the plate to aligned body ports and the remaining three plate ports opening downwardly from the plate only and connected together by a passage, a stem upon which said plate is mounted, and means for actuating said stem to align the plate ports with the requisite body ports for establishing flows to produce service, backwash and regeneration steps.

5. A multiport valve of the rotatable type comprising a body having six equally spaced apart port locations arranged in a circle, five of said locations having open ports and the remaining location having a false port, a plate supporting seat disposed in each of said locations surrounding said ports, said port locations comprising a top port location having an open port, a drain port location having an open port at 60° with respect to the top port, a drain port location having a false port at 120° with respect to the top port, a bottom port location having an open port at 180° with respect to the top port, a service port location having an open port at 240° with respect to the top port, and a reagent port location having an open port at 300° with respect to the top port, a valve plate adapted to rest upon said seats, said plate having a port extending therethrough positioned to register with the top port in a service position of the plate, a second port extending completely therethrough positioned to register with the reagent port in said service position and three downwardly opening ports connected by a passage, one of the three ports being positioned for registration with the false port, another of the three ports registering with the bottom port and the other of the three ports registering with the service port in said service position, and means for rotating the plate through successive angularities of 240°, 60° and 60° to move the plate ports through backwash, regenerating and service positions with respect to the body.

6. An article of manufacture comprising a cast metal valve body having a face provided with six port locations equidistantly spaced in a circle at 60° intervals around a common center, a plate supporting seat of resilient material disposed in each of said locations, flow connections leading to said locations, said port locations comprising a top port location, drain port locations disposed at 60° and 120° respectively with respect to the top port location, a bottom port location at 180° with respect to the top port location, a service port location at 240° with respect to the top port location and a reagent supply port location at 300° with respect to the top port location, and an injector carried on the body in communication with the reagent port location, said body having a small passage connecting the reagent port location and the top port location.

7. A control valve for controlling the flows of a base exchange water treatment apparatus, including a body and a plate cooperable therewith, said body being formed to provide a plurality of ports arranged in a circle each spaced 60° from an adjacent port, a pair of chambers comprising first and second chambers aligned with one of said ports, a nozzle between said chambers in alignment with said one port and a discharge connection leading from the second chamber in alignment with said nozzle [arranged for connection to the head space of a treatment tank of said apparatus], said first chamber being connected by a passage in the body with an adjacent port of the body, and said second chamber being adapted for connection to a supply of regenerating material.

8. *A base exchange water treating system including a treatment tank having a head space, a control valve, and conduits connecting said control valve with said treatment tank, said control valve* [A flow control valve for base exchange water treating system,] comprising a ported body and a ported plate cooperable therewith, [said body being adapted for connection to the various conduits of such system], the body being formed with a chamber communicating with one of said body ports, a passage between said chamber and an adjacent port of the body, *said adjacent port being connected through one of said conduits to the head space of the treatment tank* [said adjacent port being adapted for connection to the head space of the treatment tank of said system,] a nozzle leading from said chamber in alignment with the first mentioned one of said ports, a discharge connection in spaced alignment with said nozzle *and connected by another of said conduits with the head space of the treatment tank* [and adapted to be connected with the head space of the treatment tank] at a point below the point of connection of the aforesaid adjacent port, and a passage for supplying reagent to the space between the nozzle and the discharge connection.

*9. A valve comprising a body having a top chamber, a bottom chamber, two side chambers, a reagent chamber and an injector chamber, each of said chambers being provided with an opening for connection with a pipe, said body having a face provided with ports arranged 60° from an adjacent port, each of said ports communicating with at least one of said chambers, said body also having an injector chamber provided with an inlet connection, a passage of smaller cross-sectional area than said ports connecting said injector chamber with said top chamber, an injector tube leading from the reagent chamber, an injector nozzle disposed between said injector chamber and said reagent chamber to deliver water from the injector chamber into said tube and thereby withdraw reagent from the latter, a valve plate arranged in confronting relation to said face of said body, a cover secured to said body and enclosing said valve plate, means for introducing fluid under pressure into said cover, means on said valve plate providing enclosed transfer passage means, said valve plate having through port means extending completely therethrough, open ports extending into said transfer passage means, and blind portion means, the ports of said body and valve plate being formed upon substantially equal radii, said valve plate being movable into a plurality of operative positions including a first position in which said open through port means establishes communication between the interior of said cover and said top chamber, said transfer passage means interconnects said bottom chamber and one of said side chambers and said blind portion means closes communication to the other of said side chambers, and another position in which said open through port means establishes communication between the interior of said cover and said injector chamber to deliver water to the injector chamber for passage to the nozzle and the top chamber, said transfer passage means interconnects said bottom chamber and the other of said side chamber and said blind portion means closes a port communicating with said top chamber.*

*10. A lift turn multiple port type valve comprising a cast metal valve body having a face provided with six port locations equidistantly spaced in a circle at 60° intervals around a common center, a plate supporting seat of resilient material disposed in each of said locations, flow connections leading to said locations, said port locations comprising a top port location, drain port locations disposed at 60° and 120° respectively with respect to the top port location, a bottom port location at 180° with respect to the top port location, locations for a service port and a reagent supply port, one being at 240° and the other at 300° with respect to said top port location, and an injector carried by the body in communication with the reagent port location, said body having a passage connecting the reagent port location and the top port location.*

*11. A lift turn multiple port type valve comprising a cast metal valve body having a face provided with six port locations equidistantly spaced in a circle at 60° intervals around a common center, a plate supporting seat of resilient material disposed in each of said locations, flow connections leading to said locations, said port locations comprising a top port location, drain port locations disposed at 60° and 120° respectively with respect to the top port location, a bottom port location at 180° with respect to the top port location, a service port location and a reagent supply port location, one of the latter two locations being at 240° and the other at 300° with respect to the top port location, and an injector carried by the body in communication with the reagent port location, said body having a passage connecting the reagent port location and the top port location.*

References Cited in the file of this patent or the original patent

UNITED STATES PATENTS

| | | |
|---|---|---|
| 2,051,155 | Stagemen | Aug. 18, 1936 |
| 2,209,993 | McGill | Aug. 6, 1940 |
| 2,235,287 | Daniels | Mar. 18, 1941 |
| 2,299,802 | Daniels | Oct. 27, 1942 |
| 2,364,697 | Daniels | Dec. 12, 1944 |
| 2,451,678 | Johnson et al. | Oct. 19, 1948 |